April 18, 1933.                J. B. POWERS                    1,904,880
                  AIR COOLED INTERNAL COMBUSTION ENGINE
                   Original Filed July 9, 1929    5 Sheets-Sheet 1
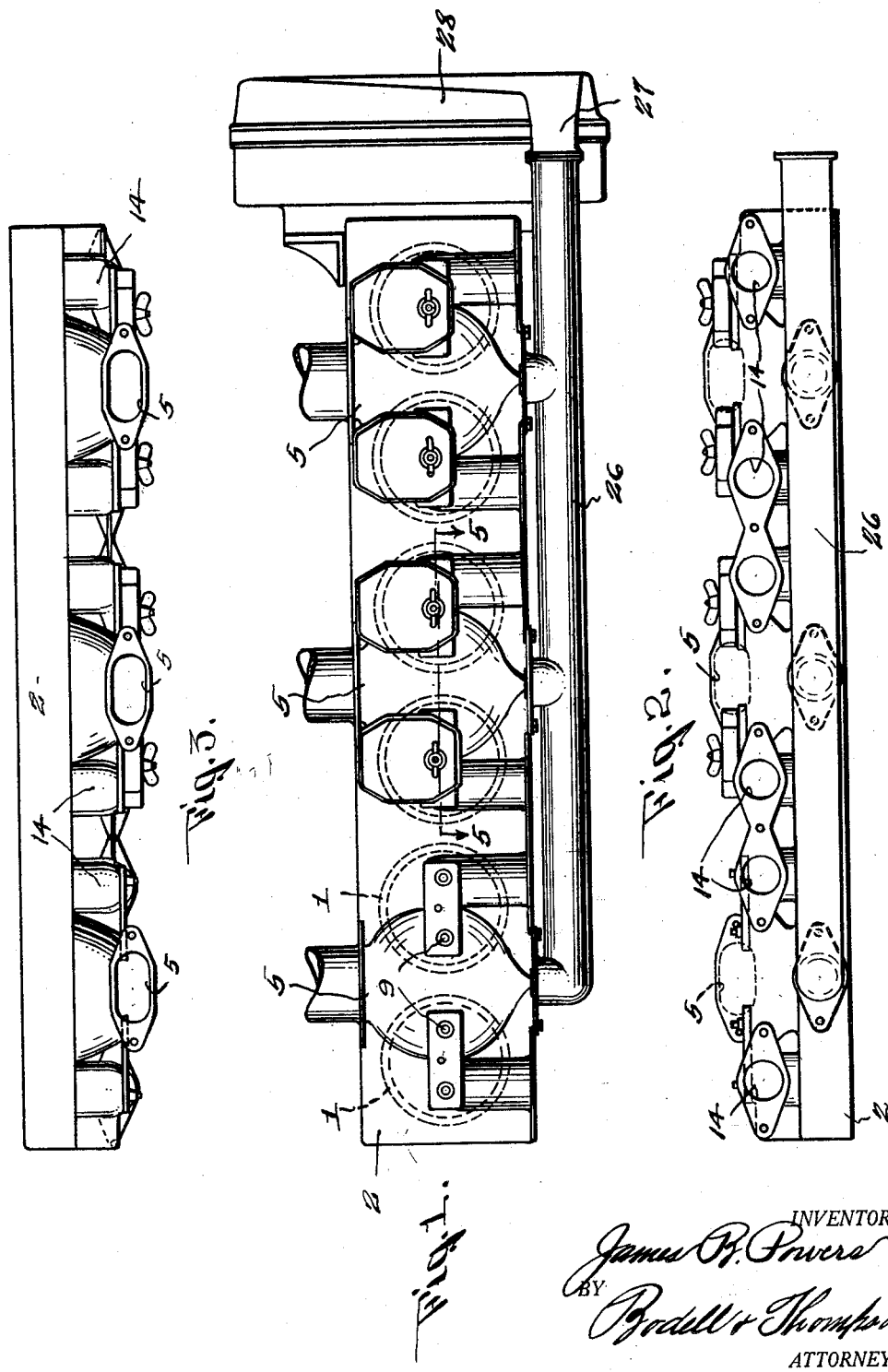
INVENTOR.
James B. Powers
BY
Bodell & Thompson
                    ATTORNEYS.

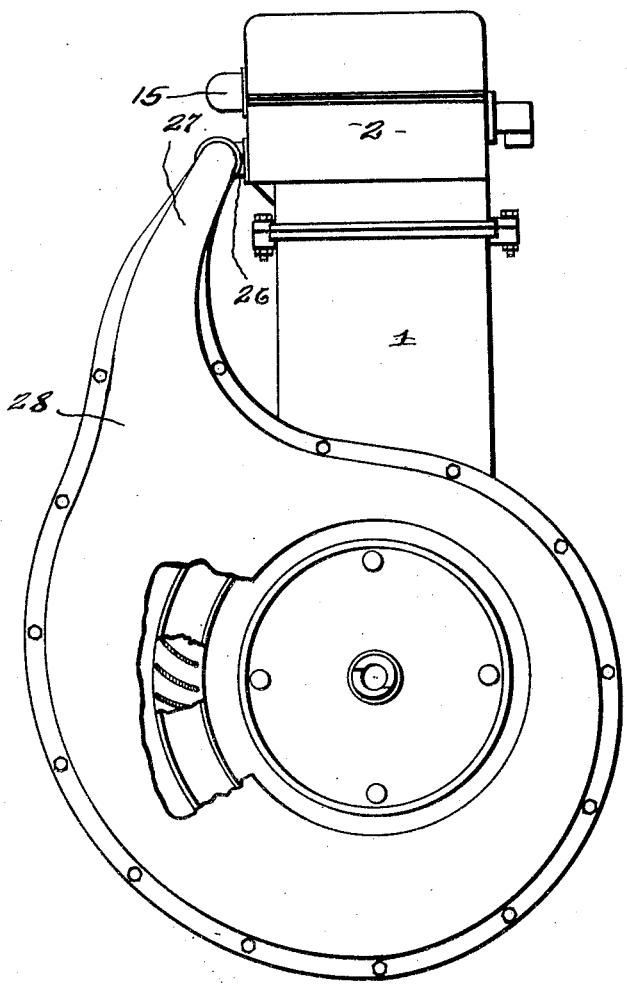

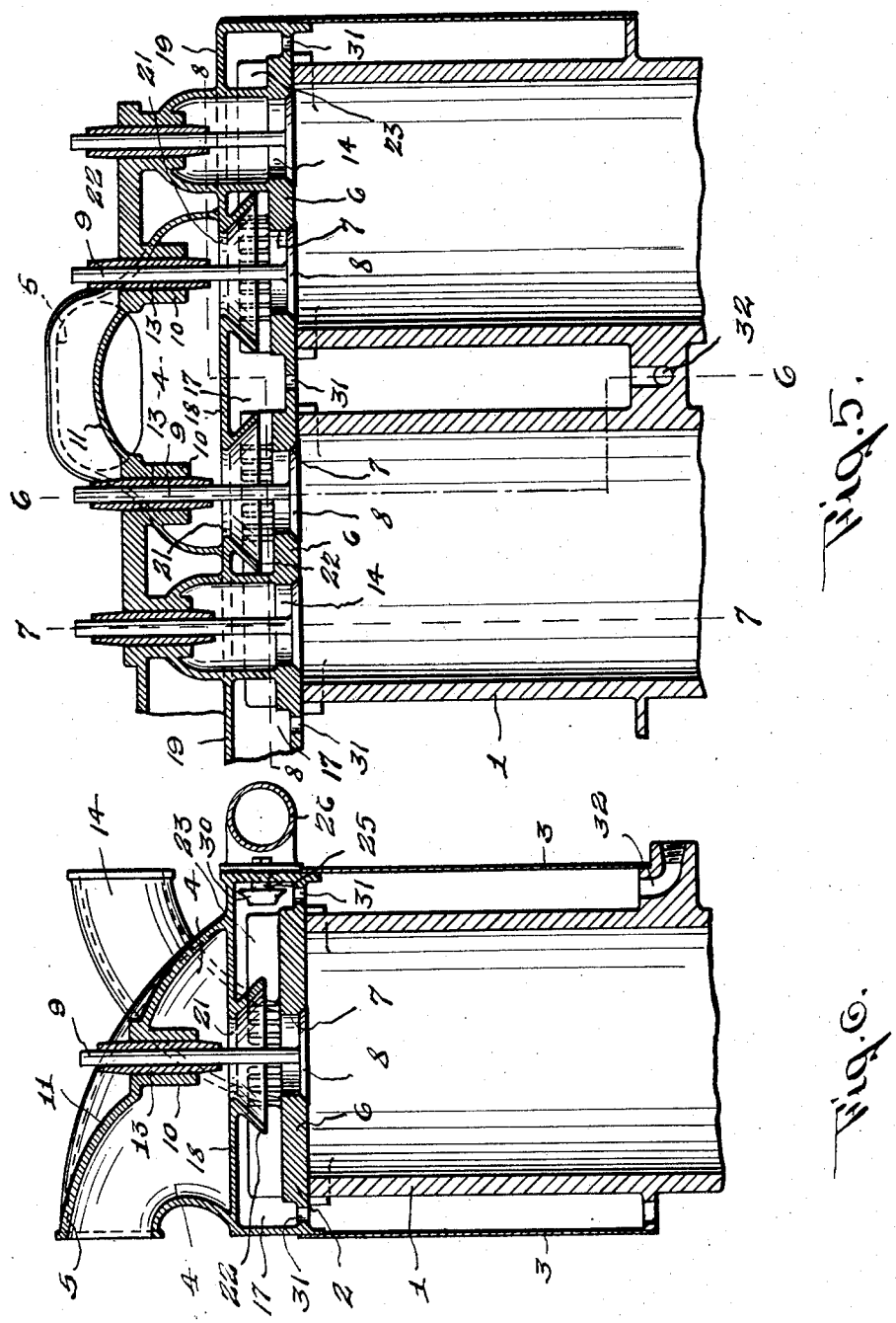

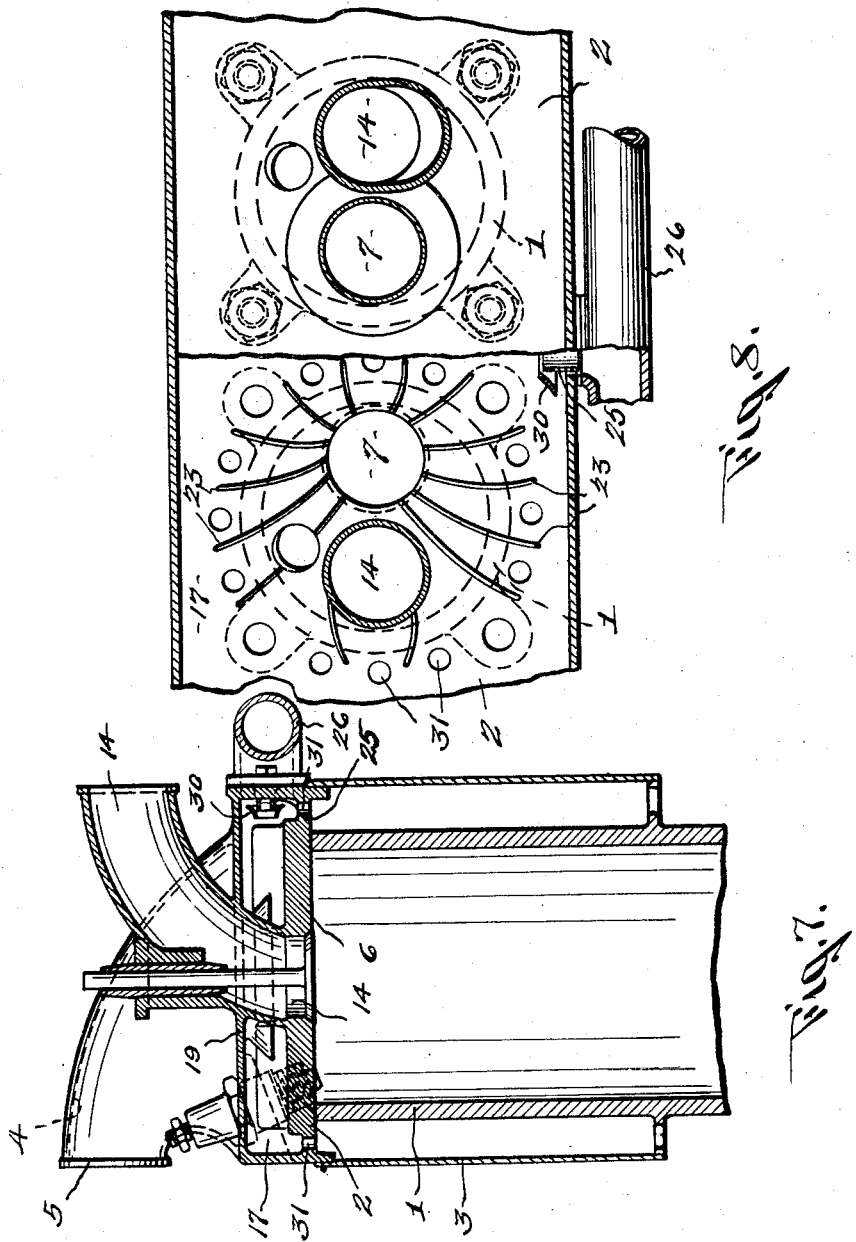

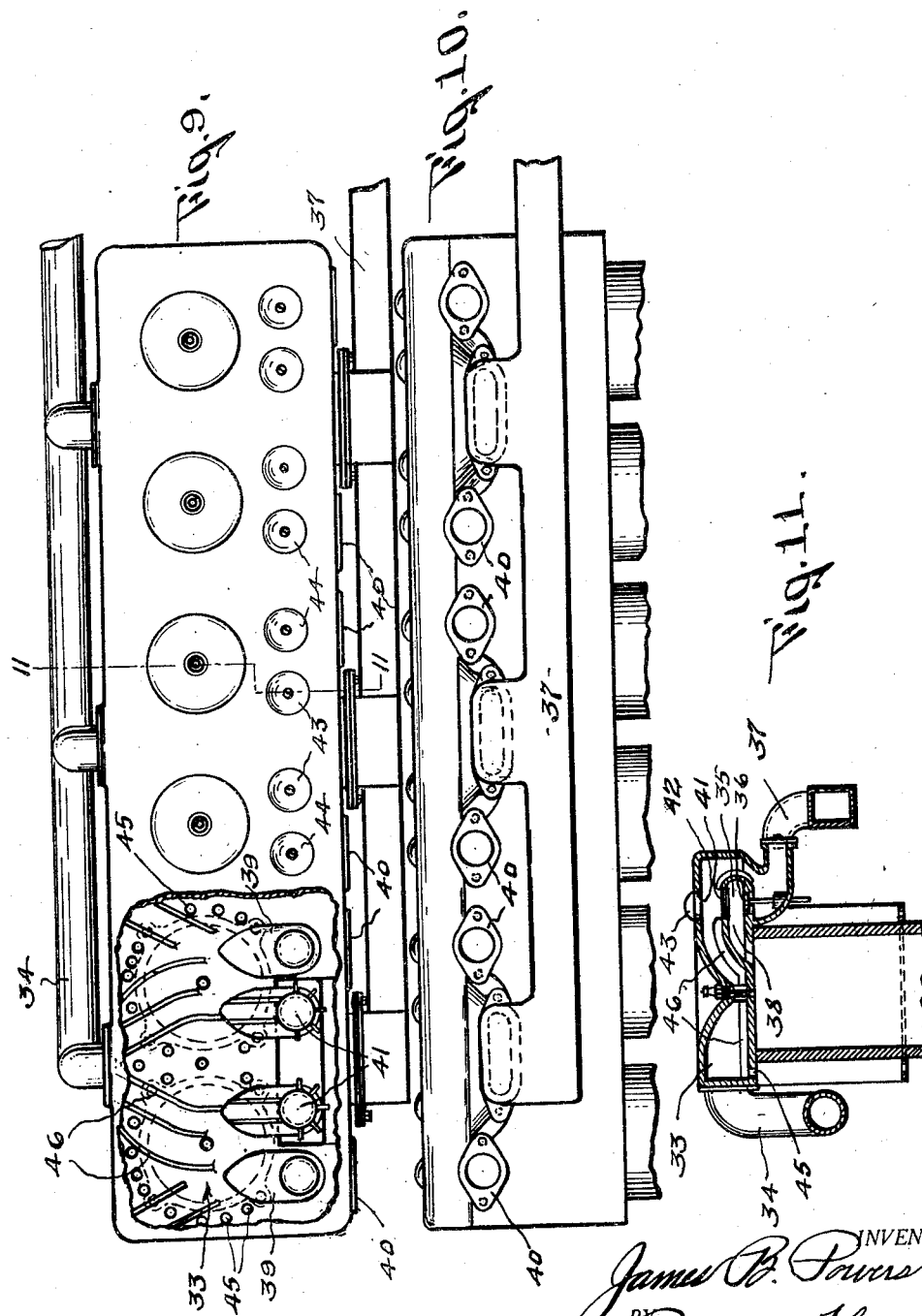

Patented Apr. 18, 1933

1,904,880

UNITED STATES PATENT OFFICE

JAMES B. POWERS, OF SYRACUSE, NEW YORK

AIR COOLED INTERNAL COMBUSTION ENGINE

Application filed July 9, 1929, Serial No. 376,896. Renewed March 9, 1932.

This invention relates to internal combustion engines and has for its object a particularly simple and efficient means for air cooling the exhaust valve and the hot portion of the cylinders adjacent the valve and hence air cooling the engine.

The invention consists in the novel features and in the combinations and constructions hereinafter set forth and claimed.

In describing this invention reference is had to the accompanying drawings in which like characters designate corresponding parts in all the views.

Fig. 1 is a plan view, partly broken away, of an engine embodying my invention.

Figs. 2 and 3 are side elevations of parts seen in Fig. 1.

Fig. 4 is a front elevation, parts being omitted of the engine, seen in Fig. 1.

Fig. 5 is an enlarged fragmentary vertical sectional view approximately on line 5—5, Fig. 1, the valve casings being omitted.

Fig. 6 is a sectional view on line 6—6, Fig. 5.

Fig. 7 is a sectional view on line 7—7, Fig. 5.

Fig. 8 is a horizontal sectional view on line 8—8, Fig. 5.

Figs. 9 and 10 are respectively a plan and side elevation of an engine block with an L head embodying my invention, Fig. 9 being partly broken away.

Fig. 11 is a sectional view on line 11—11 Fig. 9.

In air cooled engines, the valves are preferably located in the heads of the cylinders and the exhaust valves because air cannot be brought into intimate contact therewith become overheated and the guides for the valve rods become burned off, and also because of the high temperature of the cylinder or the head thereof adjacent the exhaust valves relatively to the temperature of the cylinder adjacent the intake valve, the cylinder head warps out of shape so that the exhaust valve does not seat accurately, resulting in loss of power and burning of the exhaust valves.

This invention consists in a cylinder construction particularly a cylinder head construction whereby the cooling air current is brought into intimate contact with the exhaust valve and the portion of the cylinder adjacent the exhaust valve head, cooling the exhaust valve and lowering, to a large extent, the temperature of the exhaust gases.

In the engine here shown the cylinders are provided with detachable heads and the heads are adequately cooled so that the cylinder walls require comparatively little cooling as the greater part of the heat is confined to the head.

1 designates the cylinders, and 2, the heads. The cylinders can be formed en bloc or in groups and the detachable heads correspondingly formed. The cylinders are here shown as surrounded by jackets 3. The cylinder wall is left rough or formed with small integral heat radiating flanges. The heads 2 are formed with chambers 4 for the exhaust gases, the chambers 4 communicating with the exhaust manifold through outlets 5. The outlets 5 are usually located opposite the spaces between the cylinders. The head wall 6 is formed with an exhaust port 7 which discharges into the chamber 4 of the head, this port being controlled by an exhaust valve 8 having its stem 9 extending upwardly through the top of the adjacent chamber 4 and movable in the usual guide 10 mounted in the top wall 11 of the exhaust chamber 4. A guide bushing 13 is mounted in the guide 10.

In ordinary air cooled combustion engines, the temperature is so high as to destroy the valve guides and bushings and to warp the head of the cylinder.

The head is also formed with an intake port 14 extending through the chamber thereof; the intake port curves upwardly and laterally toward one side of the engine and couples to the intake manifold 15, while the chamber 4 discharges through the port 7 into the exhaust manifold on the other side of the engine. The head is detachably secured to the cylinders in any suitable manner.

The valves are actuated in any well known manner, usually by overhead mechanism as rocker arms which are actuated by push rods coacting with cams on the camshaft as in any well known valve-in-the-head motor.

(See Wilkinson Patent, 1,624,453, dated April 12, 1927.) The overhead mechanism, as rocker arms, is located in casings mounted on the cylinder heads. The hollow head is provided with inlets for cooling air currents arranged to discharge against the cylinder head wall 6, the valve heads 8 and stems 9.

In a multi-cylinder engine, the exhaust ports of adjacent cylinders are usually arranged side by side so that the exhaust ports of the cylinders Nos. 1 and 2 are arranged nearest the space between the cylinders Nos. 1 and 2 and the exhaust ports of the cylinders Nos. 3 and 4 are located nearest the space between those cylinders and each chamber 4 is common to the exhaust valves of each pair of cylinders and the top wall 11 thereof is dome-shaped.

Preferably, an air cooling chamber 17 is located in the lower part of the chambers 4 and the head walls 6 and separated from the main part of the chamber 4 by a partition 18. The air cooling chamber is common to all the cylinders of the block. 19 is the top wall of the air cooling chambers 17 outside of the dome-shaped tops of the chambers 4. The intake ports 14 extend through the air cooling chamber 17. The overhead valve mechanism is carried on the upper parts of the intake ports and the wall 11 of the exhaust chamber 4. The entire head structure including the head wall 6 and exhaust chambers are preferably integral. Owing to spacing of the supports for the overhead valve mechanism the head structure is open to circulation of air outside the head.

The partitions 18 are formed with openings 21 aligned with the exhaust ports 7 and are formed with depending inverted funnels or Venturi nozzles 22, the lower edges of which are spaced from the head walls 6. The head walls are formed comparatively thin (about one half inch) and are formed with reinforcing and heat radiating ribs 23 on their upper side in the cooling chamber 17, these ribs radiating from the exhaust ports 7 and terminating short of the upper edges of the chamber 17. Preferably the air is forced into the chambers 17.

As here shown the air intakes are located between each two cylinders and are arranged to discharge transversely of the exhaust chambers or the air cooling chamber portions thereof. The air is discharged into the chambers 17 through jet nozzles 25 which communicate with an air conduit 26 extending lengthwise of the line of cylinders and communicating at one end with the outlet 27 of a blower or fan casing 28 having the fan rotor thereof mounted on the front end of the crankshaft of the engine, as in the well known Franklin engine illustrated in the Wilkinson Patent No. 1,624,453, issued April 12, 1927.

The nozzles are arranged in juxtaposition to outer nozzles 30 to form injectors, the outer nozzle communicating at its outer side with the outer air through holes 31 in the outer overhanging margin of the head walls 6, the holes 31 opening into the jackets 3. The injector acts to draw air by suction through the jackets of the cylinders. Obviously, the current of air passing through the nozzles 25 and 30 is directed against the exhaust valve heads 8, the stems 9 and flanges 23 and also the hot portion of the cylinder head wall around the exhaust ports 7, and this current of air cools the exhaust gases by mingling with them immediately as the gases pass through the port 7. The exhaust passes through the funnel 22 into the exhaust dome 4 with an injector action which sucks the air upwardly through the jacket 3, holes 31, thus creating an upward current of air around the cylinders. The jackets have inlet holes 22 at their lower ends and one of these inlets 32 of each cylinder or pair may be connected to the blower casing if desired.

Although the partition 18 may be omitted; nevertheless, I prefer to employ it to provide for the Venturi nozzles 30 which causes the exhaust to have an injector action in the exhaust domes 4 and prevent the exhaust from backing up in the chamber 17 and possibly out through the air nozzles 25 against the air pressure and also the partition 18 provides for extending the air chamber 17 across the heads of the cylinders or provides for an air chamber common to a plurality of all of the cylinders; so that, when the exhaust valve of any one cylinder is closed and the air blowing into the chamber 17 adjacent such exhaust valve, the air in the chamber will not be trapped but will always have an outlet through the exhaust manifold either through the exhaust dome 4 adjacent thereto or through an exhaust dome more remote through which the cylinder of that remote exhaust dome is in the act of discharging.

Although I have shown my air cooling system as applied to a valve-in-the-head motor in Figs. 1 to 8 conclusive, nevertheless, it may be applied to any type of motor and in Figs. 9, 10 and 11 it is shown as applied to an L-head motor. In the form shown in Figs. 9, 10, and 11, 33 is the air chamber which is common to a plurality or all of the cylinders. 34 is the pipe through which air is supplied to the chamber 33 from the fan or other source. 35 is the exhaust dome or passage; 36, the exhaust valve therein and 37, the exhaust manifold. 38 is the exhaust port which extends over into the L of the head.

39 is the intake port formed in each head and 40 are the faces at the outer ends of the port 39 to which the intake manifold is secured. 41 is a plug in the upper wall of the exhaust port in line with the valve for permitting the insertion or removal of the exhaust valve through a work hole 42 in the top wall of the head which work hole is closed by a plug 43 in the top wall of the head. The intake valves are removable and replaceable in a similar manner. 44 designates the plugs for the intake valves corresponding to the plugs 43. 45 are air holes through which the air is sucked into the chamber 33 by the injector or ejector action of the exhaust gases through the exhaust port 38 and into the exhaust dome 35. 46 are the heat radiating and reinforcing flanges on the head wall arranged to direct the air onto the wall of the exhaust passage 36.

Insofar as the principal feature of my invention is concerned the jackets may be omitted and the air drawn into the head, when the exhaust valves are opened, by the injector or ejector action of the exhaust. In the form shown in Figs. 9, 10 and 11, when the exhaust valve is opened the air is drawn through the chamber 33 over the exhaust passage 38 and down around and in contact with the lower side of the L of the head formation around the exhaust valve and the seat thereof and the jet created through the open exhaust valve creates the suction in the chamber 33 to draw in the air. The air mingles with the exhaust in the dome 35. The air in passing to the exhaust dome passes over and in contact with the cylinder head wall and the reinforcing and heat radiating flanges. When the top exhaust valve is closed the air is blown in direct contact with the head wall of the cylinder.

In any form of my invention, the cooling current of air mingles with the exhaust gases and cools them, and the jet nozzles for the air are arranged so that they discharge the air directly against the exhaust valves when the exhaust valves are closed and against the hot portions of the head walls of the cylinder.

Because air is intimately mixed with the hot exhaust gases, the carbon monoxide in the exhaust gases can be neutralized in the presence of a suitable catalyser in the exhaust system as for instance copper bars or plates may be placed in the exhaust system or the exhaust manifold or a portion thereof may be formed of copper.

What I claim is:

1. In an internal combustion engine, the combination of a cylinder, a head for the cylinder formed with an exhaust chamber having inlets for cooling air and having a port opening between the cylinder and the exhaust chamber formed to cause injector action by the exhaust gases for drawing a cooling air current over the outside wall of the cylinder and into said chamber.

2. In an internal combustion engine, the combination of a cylinder, a head for the cylinder formed with an exhaust chamber and an opening between the cylinder and the exhaust chamber, said opening being of injector form, a valve for controlling the flow of exhaust gas through the opening, an air inlet into the exhaust chamber through which air is drawn from over the outside wall of the head by the injector action of the exhaust.

3. In an internal combustion engine the combination of a cylinder, a head for the cylinder formed with an exhaust chamber and a port opening from the cylinder into the chamber, a valve for controlling said port, an air passage open to the air at the lower end and leading across the outside walls of the cylinder and into said chamber.

4. In an air cooled internal combustion engine, the combination of a cylinder, a hollow head mounted on the cylinder and enclosing an exhaust chamber for connection to the exhaust manifold, the bottom wall of the chamber, which separates the chamber from the interior of the cylinder, having an exhaust port, an exhaust valve for controlling said port having a stem extending through the chamber, a transverse partition in said chamber, having an opening in line with the exhaust port, and means for passing a current of air transversely into the chamber below the partition.

5. In an air cooled internal combustion engine, the combination of a cylinder, a hollow head mounted on the cylinder and enclosing an exhaust chamber for connection to the exhaust manifold, the bottom wall of the chamber which separates the chamber from the interior of the cylinder, having an exhaust port, an exhaust valve for controlling said port having a stem extending through the chamber, a transverse partition in said chamber having an opening in line with the exhaust port, and means for passing a current of air transversely into the chamber, comprising an injector nozzle discharging into the chamber below the partition.

6. In an air cooled internal combustion engine, the combination of a cylinder, a hollow head mounted on the cylinder and enclosing an exhaust chamber for connection to the exhaust manifold, the head wall of the cylinder arranged to discharge into said chamber having an exhaust port, an exhaust valve controlling said port having a stem extending upwardly through the chamber, means for passing a current of air transversely against the valve, its stem and head wall of the cylinder comprising a nozzle directed into said chamber and opening on its outer side into the outer air and a jet nozzle extending into the outer nozzle and arranged therein to form an injector and means for forcing air into the nozzle.

7. In an internal combustion engine, the combination of a cylinder having a hollow head mounted on the cylinder, an exhaust port in the wall of the head which separates the chamber from the interior of the cylinder, an intake valve port extending from the cylinder through said chamber, the exhaust valve port opening into said chamber, a valve for controlling the exhaust port and having a stem extending through said chamber, a valve stem guide extending into said chamber and means for passing a current of air through said chamber into contact with the exhaust valve, the guide and the walls of said chamber adjacent the valve.

8. In an internal combustion engine, the combination of a plurality of cylinders, a head mounted on the cylinders, and formed with an internal exhaust chamber and with a transverse partition therein, the cylinder head wall of said chamber being formed with an exhaust port, the partition being provided with an opening aligned with the exhaust port, an intake port formed in the cylinder head wall and a passage leading therefrom, for connection to the intake manifold, intake and exhaust valves in said ports, the exhaust valve having its stem extending through said opening in the partition and the top wall of the exhaust chamber being provided with a guide for the stem of the exhaust valve and an inlet for air opening into the chamber below said partition.

9. In an internal combustion engine, the combination of a plurality of cylinders, a head mounted on the cylinders and formed with an internal exhaust chamber and with a transverse partition therein, the cylinder head wall of said chamber being formed with an exhaust port, the partition being provided with an opening aligned with the exhaust port, an intake port formed in the cylinder head wall and a passage leading therefrom, for connection to the intake manifold, intake and exhaust valves in said ports, the exhaust valve having its stem extending through said opening in the partition through the top wall of the exhaust chamber, said top wall being provided with a guide for the stem of the exhaust valve, an inlet for air opening into the chamber below said partition, and means for forcing air into the chamber below the partition.

10. In an internal combustion engine, the combination of a plurality of cylinders, a head mounted on the cylinders, and formed with an internal exhaust chamber and with a transverse partition therein, the cylinder head wall of said chamber being formed with an exhaust port, the partition being provided with an opening aligned with the exhaust port, an intake port formed in the cylinder head wall and a passage leading therefrom, for connection to the intake manifold, intake and exhaust valves in said ports, the exhaust valve having its stem extending through said opening in the partition and through the top wall of the exhaust chamber, said top wall being provided with a guide for the stem of the exhaust valve and an outlet for air opening into the chamber below said partition, the portion of the chamber below the partition having an opening therein, and means for forcing air into the chamber below the partition.

11. In an internal combustion engine, the combination of a plurality of cylinders, a head mounted on the cylinders and formed with internal exhaust chambers and a transverse partition therein, the cylinder head walls of said chambers being formed with exhaust ports, the partition being provided with openings aligned with the exhaust ports, intake ports formed in the cylinder head walls and passages leading therefrom for connection to the intake manifold, intake and exhaust valves in said ports, each exhaust valve having its stem extending through one of said openings in the partition and through the top of the exhaust chamber, said top wall being provided with a guide for the stem of the exhaust valve and inlets for air opening into the chambers below said partition, margins of the cylinder head walls overhanging the cylinder wall and being provided with openings into the portion of the chamber below the partition, and jackets around the cylinders and comunicating at their upper ends with said openings, the jackets having inlets for air.

12. In an internal combustion engine, the combination of a plurality of cylinders, a head mounted on the cylinders and formed with internal exhaust chambers with a transverse partition therein, the cylinder head walls of said chamber being formed with exhaust ports, the partition being provided with openings aligned with the exhaust ports, intake ports formed in the cylinder head walls and passages leading therefrom, for connection to the intake manifold, intake and exhaust valves in said ports, the exhaust valves having their stems extending through said openings in the partition and in the top walls of the exhaust chamber, said top walls being provided with guides for the stems of the exhaust valves and inlets for air opening into the chambers below said partition, the cylinder head wall overhanging the cylinder wall and being provided with openings into the portion of the chamber below the partition, jackets around the cylinders and communicating at their upper ends with said openings, the jackets having inlets for air, and means for blowing air into the chamber below said partition.

13. In an internal combustion engine, the combination of a head having an exhaust port, an exhaust chamber having an injector therein in juxtaposition to the exhaust port whereby the exhaust is passed into said chamber with an injector action, an exhaust valve and means for passing air in said chamber around said port and valve.

14. In an internal combustion engine, the combination of a cylinder having its head formed with an air chamber, an exhaust port, and an exhaust dome, the exhaust port being arranged to discharge into the dome with an injector action and the air chamber communicating with said dome, the air chamber having inlets and an exhaust valve for controlling said port.

15. In an internal combustion engine the combination of a cylinder having its head formed with an air chamber, an exhaust dome, and an exhaust port, the exhaust port being arranged to discharge into the dome, the air chamber communicating with said dome, an exhaust valve for controlling said port, said chamber being provided with passages for air around the valve and port and over the head wall of the cylinders.

16. In a multi-cylinder internal combustion engine the combination of cylinders having their head formed with an air chamber, exhaust domes and exhaust ports being arranged to discharge into the domes respectively with an injector action and the air chamber communicating with each dome, the air chamber having air inlets, exhaust valves for controlling said ports, and means for passing air into said chamber around the exhaust valves and ports and over the head walls of the cylinders.

17. In a multi-cylinder internal combustion engine the combination of cylinders having their head formed with an air chamber, exhaust domes and an exhaust ports being arranged to discharge into the domes respectively with an injector action and the air chamber communicating with each dome, the air chamber having air inlets, exhaust valves for controlling said ports, and means for passing air into said chamber around the exhaust valves and ports and over the head walls of the cylinders, said air chamber being common to a plurality of cylinders and the exhaust domes individual to the exhaust ports of the cylinder.

18. In an internal combustion engine, a cylinder having intake and exhaust valves in the head thereof, an exhaust chamber having an opening alined with the port controlled by the exhaust valve, and an air jacket between the cylinder head and the exhaust chamber, the air jacket having an inlet for air, and discharging into said opening around the exhaust valve, and valve operating mechanism.

In testimony whereof, I have hereunto signed my name, at Syracuse, in the county of Onondaga, and State of New York, this 2nd day of July, 1929.

JAMES B. POWERS.